(12) United States Patent
Ruschulte et al.

(10) Patent No.: US 9,061,422 B2
(45) Date of Patent: Jun. 23, 2015

(54) DEVICE FOR HANDLING OBJECTS

(75) Inventors: Jörg Ruschulte, Rickenbach (DE); Christoph Riethmueller, Leonberg (DE)

(73) Assignee: GLOBAL SAFETY TEXTILES GMBH, Maulburg (DE)

( * ) Notice: Subject to any disclaimer, the term of this patent is extended or adjusted under 35 U.S.C. 154(b) by 0 days.

(21) Appl. No.: 14/006,360

(22) PCT Filed: Feb. 28, 2012

(86) PCT No.: PCT/EP2012/000863
§ 371 (c)(1), (2), (4) Date: Sep. 25, 2013

(87) PCT Pub. No.: WO2012/126567
PCT Pub. Date: Sep. 27, 2012

(65) Prior Publication Data
US 2014/0010628 A1  Jan. 9, 2014

(30) Foreign Application Priority Data

Mar. 22, 2011 (DE) .......................... 10 2011 014 674

(51) Int. Cl.
*B66C 1/46* (2006.01)
*B25J 15/00* (2006.01)
(Continued)

(52) U.S. Cl.
CPC .............. *B25J 15/00* (2013.01); *B25J 15/0023* (2013.01); *B25J 15/008* (2013.01); *B65G 47/90* (2013.01); *B25J 15/0608* (2013.01)

(58) Field of Classification Search
CPC .............. Y10S 294/902; B25J 15/0616; B25J 15/0023; B25J 15/008; B25J 15/0608; H01F 7/206; H01F 7/0257; E21B 31/06; F15B 15/103; F15B 15/10; F15B 2201/205; F04B 43/08; F04B 43/0063; B66F 3/35; A47C 27/081; A47C 27/10; A47C 7/021; A61G 7/05769; A61G 7/05776; B25G 47/90

USPC ................ 294/65.5, 98.1, 119.3, 2, 902, 219; 92/90, 92; 5/653–654, 655.3, 644, 706, 5/710, 715
See application file for complete search history.

(56) References Cited

U.S. PATENT DOCUMENTS 4,778,326 A   10/1988  Althouse et al.
5,067,189 A * 11/1991  Weedling et al. ............ 5/81.1 R
(Continued)

FOREIGN PATENT DOCUMENTS

DE   112007001758 T5   9/2009
JP   2005286114 A     10/2005
JP   2007157822 A      6/2007

OTHER PUBLICATIONS

PCT International Search Report; Date of Mailing: Jul. 18, 2012; Applicant's File Reference No. 28-662-wo; International Application No. PCT/EP2012/000863; International Filing Date: Feb. 28, 2012; Applicant: Global Safety Textiles GmbH; Date of Actual Completion of International Search: Jul. 2, 2012; Date of Mailing of International Search Report: Jul. 18, 2012.

*Primary Examiner* — Stephen Vu
(74) *Attorney, Agent, or Firm* — Pearne & Gordon LLP

(57) ABSTRACT

A device for handling objects is provided, comprising at least one inflatable air chamber and a retaining unit for objects, which is attached to the air chamber, to a robot or manipulator, characterized by at least one device for handling objects. Also provided is a method for handling objects using the aforementioned device, characterized by the steps of: moving the device with the side thereof comprising the retaining unit to the object to be handled in a first position; establishing an adhesive connection between the retaining unit and the object to be handled, thus retaining the object; moving the device to a desired second position, and releasing the object from the retaining unit by inflating the at least one air chamber.

10 Claims, 4 Drawing Sheets

(51) Int. Cl.
*B65G 47/90* (2006.01)
*B25J 15/06* (2006.01)

(56) References Cited

U.S. PATENT DOCUMENTS

| | | | | |
|---|---|---|---|---|
| 5,375,273 A | * | 12/1994 | Bodine et al. | 5/710 |
| 5,603,647 A | * | 2/1997 | Van Adrichem et al. | 441/106 |
| 5,755,459 A | * | 5/1998 | LaLonde | 280/728.3 |
| 5,833,291 A | * | 11/1998 | Haugs | 294/119.3 |
| 2003/0168553 A1 | * | 9/2003 | Diehl et al. | 244/129.1 |
| 2008/0277954 A1 | * | 11/2008 | Brooks et al. | 294/147 |
| 2009/0050518 A1 | | 2/2009 | Kasama | |
| 2009/0224561 A1 | * | 9/2009 | Jackson, III | 294/65.5 |

\* cited by examiner

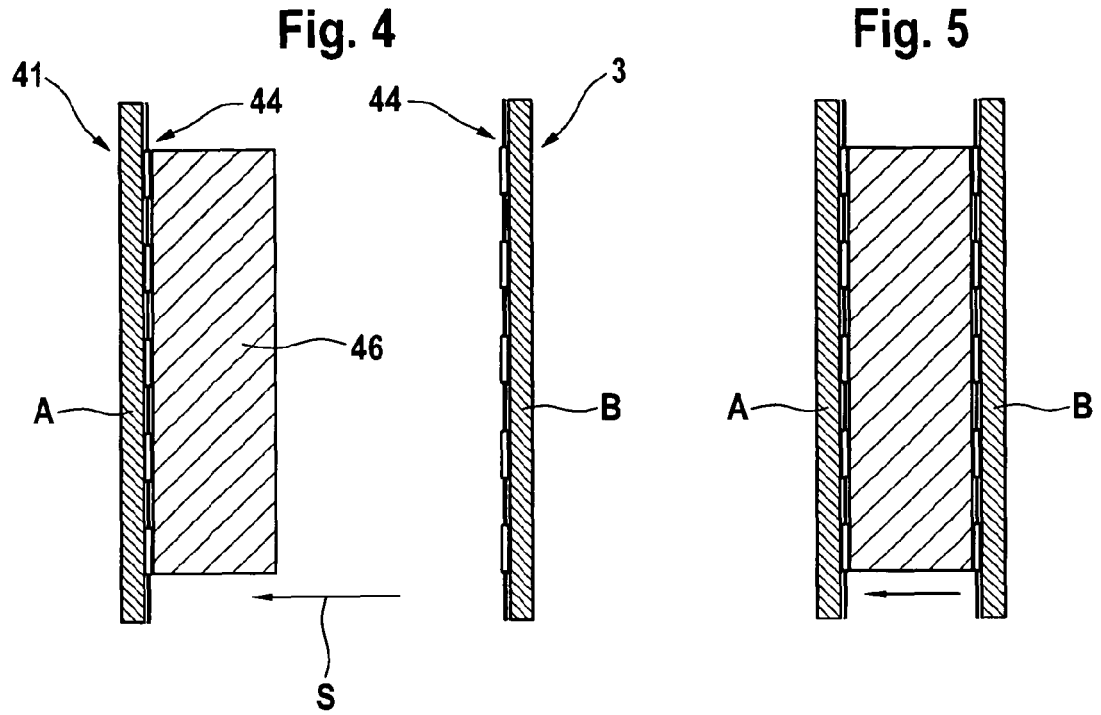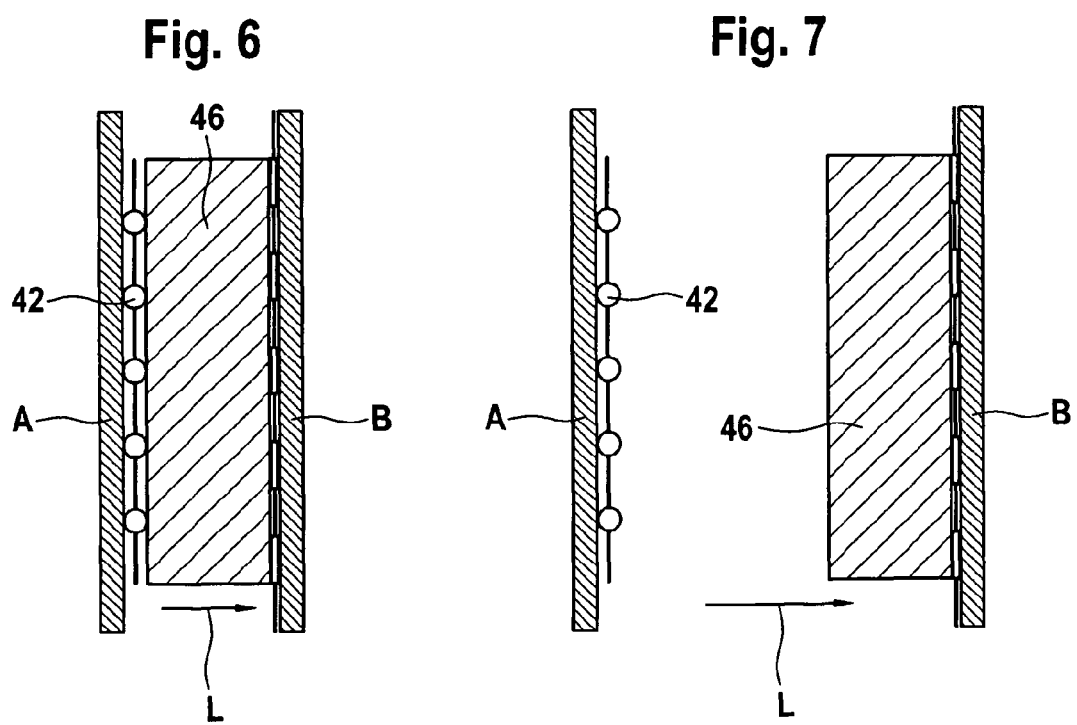

DEVICE FOR HANDLING OBJECTS

CROSS-REFERENCES TO RELATED APPLICATIONS

This application is the national phase of International Application No. PCT/EP2012/000863 filed on Feb. 28, 2012, which claims the benefit of priority to German Patent Application No. 10 2011 014 674.1 filed on Mar. 22, 2011. The entire disclosures thereof are incorporated herein by reference.

BACKGROUND OF THE INVENTION (1) Field of the Invention

The present invention relates to a method and device as well as to a manipulator for handling articles.

(2) Description of Related Art

There are known mechanical and pneumatic gripper systems which are used primarily in automated gripper systems for the manipulation of articles, wherein adjusting the gripper to the shape and sensitivity of the articles to pressure to be moved involves elaborate settings and control functions, also necessitating a very accurate detection (possibly optical) of the position of the sensitive article to avoid injury or damage. These include food, such as raw eggs, hollow chocolate sweets, plants, fragile technical products, etc.

Devices are known from the prior art, having a complicated mechanism, which adjusts the articles to be gripped and requires a complex control such as an interactive system of control sensors. In addition to this, manufacturing such a mechanism is complicated.

BRIEF SUMMARY OF THE INVENTION

The invention has the object of proposing a method and a device and a manipulator for handling articles, which avoids, or at least greatly diminishes, the known disadvantages of prior art.

This object is firstly achieved by a device as follows.

The inventive device for handling articles can be advantageously zoomed into contact with the article until the retainer holds it tight. For this purpose, the air chamber may be already slightly inflated in thus helping to avoid a "hard" contact with the article. After a connection has been formed between the retainer and the article, the device may be moved in any desired manner and in any desired position, in which the article is to be released from the device again. This is due to the advantageous embodiment of the device according to the invention without damaging the article because the air chamber is inflated resulting in curvature of the air chamber gently and gradually pushing away the retainer, rendering the holding connection between the retainer and the article in the contact area no longer sufficient to retain the article. During this process, the fact is exploited that the outer shape of the article does not adapt to the curvature of the inflated air-chamber.

In an advantageous embodiment of the invention, the air chamber of the device comprises at least two layers of woven textile fabrics. Although it would be possible to fabricate an air chamber made of plastic film, or other soft materials, engineering the air chamber with at least two textile fabric layers is considerably more flexible, while allowing a universal design as well as the advantage of determining the desired strength of the material, and this highly economically. A variable setting of the specific retaining force of the retainer is easier to accomplish.

In a further advantageous embodiment of the invention, the air chamber has at least one seam extending around the two textile layers of fabric. The seam now makes it possible to apply applications, such as retainers and the like in the direct vicinity of the air chamber. It is course, just as possible to arrange such applications directly in the area of the fabric layers.

In another advantageous embodiment of the invention, the two textile fabric layers are actually stitched in terms of stitching along the seam as such depending on the desired strength or safety requirement with one or more of the seams. Alternatively, an adhesive bond or weld and the like could be used.

In still a further advantageous and particularly preferred embodiment of the invention, the two textile layers of fabric are interwoven in one piece (OPW=one-piece-woven), wherein said seam represents a single-layer portion surrounding the two textile fabric layers (two-layer portion), as a woven seam in surrounding the air chamber. With this embodiment of the device according to the invention all the advantages of OPW technology are now available, only some of which will be mentioned here. Employing OPW technology with all its advantages now makes it possible to fabricate the air chamber fully automated in just one single step. Weaving the air chamber, configuring and customizing are now done with the utmost precision and at the same time. All additionally necessary steps in the work required in other technologies such as positioning parts of the air chamber relative to each other for stitching, positioning the stitched seam and the stitching itself, etc. are now eliminated, there also being no further need for any special sealing of "stitched seams" as required in any customized solution.

In another advantageous embodiment of the invention, the retainer is designed as a bonding coating containing an adhesive as may be affixed to very lightweight articles, such as undercured silicone.

In yet another advantageous embodiment of the invention, the retainer comprises magnets. This embodiment has proved to be a great advantage for handling ferrous metal articles.

In still a further advantageous embodiment of the invention, the retainer comprises at least one active face of a Velcro fastener.

In another advantageous embodiment of the invention the device is characterized in that it comprises a plurality of spaced-apart air chambers and a plurality of retainers disposed between the air chambers, boosting reliable functioning whilst greatly adding to the number of possible applications.

The object is also achieved with a robot or the manipulator, characterized by at least one device for handling articles.

The object of the invention is further achieved by a method for handling articles, which is characterized by the steps of:
 e) moving the device with its side comprising the retainer to the article for handling into a first position,
 f) allowing an adhesive bond between the retainer and the article for handling, thereby retaining the article,
 g) operating the device to a desired second position,
 h) releasing the article from the retainer by inflating said at least one air chamber.

The advantages of this inventive method are obvious as already presented in detail above in the description of the advantages of the device and its deployment.

In accordance with the invention its prime aim is advantageously to introduce OPW components in areas such as automation, logistics, packaging and the like in thereby substituting complex solutions by simpler solutions. The functions:

pick and place are controlled by applying pressure and dumping pressure. Manipulating is done, as before, by a robotic or manipulator arm.

Construction elements for the production of OPW components are, for example:
Integrated elements (designs):
X-tether
tube-tether
tubes
Combination OPW and customized components:
combination of tubes and sheet fabric
combination of tubes differing in diameter
More:
pneumatic connections
coating (plating)

BRIEF DESCRIPTION OF THE SEVERAL VIEWS OF THE DRAWINGS

For a better understanding of the invention it will now be briefly described by way of example embodiments with reference to a drawing, in which:

FIGS. 4 to 7 are diagrammatic views of an example embodiment II, "transfer gripper" in different positions of the device.

DETAILED DESCRIPTION OF THE INVENTION

Figure 1A:
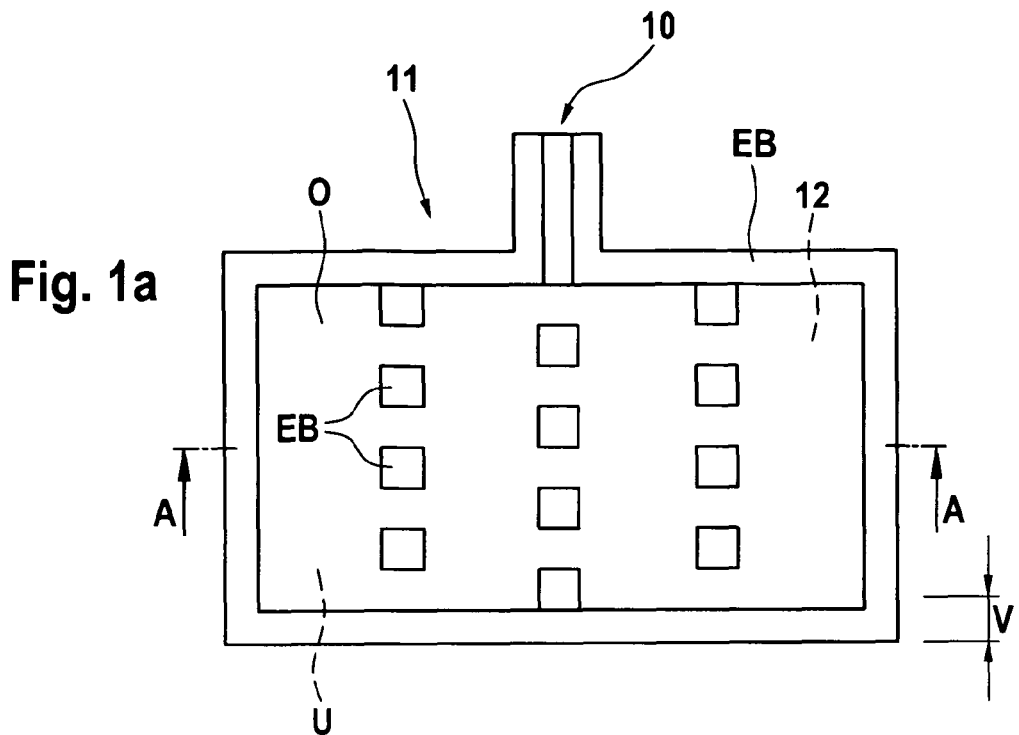
FIG. 1a is a simple diagrammatic top-down view of a first example embodiment of the device according to the invention.

In the following description, the same or analogous components have the same reference numerals.

Referring now to FIG. 1a there is illustrated a view of a device 11 according to the invention with—because situated between fabric layers O and U and therefore not visible—an air chamber 12 formed preferably as OPW. Single-layer areas in the interior of the device 11 and the surrounding seam are designated EB. The air chamber may also consist of two layers of fabric O, U stitched together conventionally. In this example embodiment, a retainer 14 for articles 16 in the form of an adhesive coating (FIG. 1b) is secured to the air chamber 12 over the entire surface, but not necessarily so. At points 18 and other points, the device 11 can be attached to a manipulator or robotic device R (FIG. 2b). Provided above in FIG. 1a is an inflation port 10 for the air chamber 12.

Figure 1B:
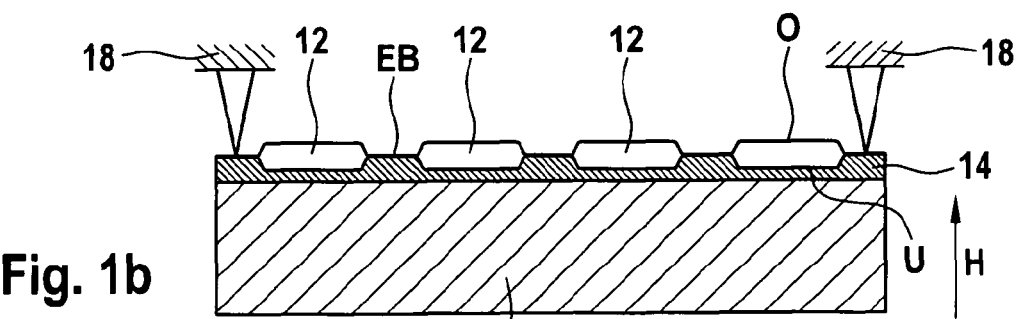
FIG. 1b is a section view of the device as shown in FIG. 1a with a non-inflated air chamber.
Figure 1C:
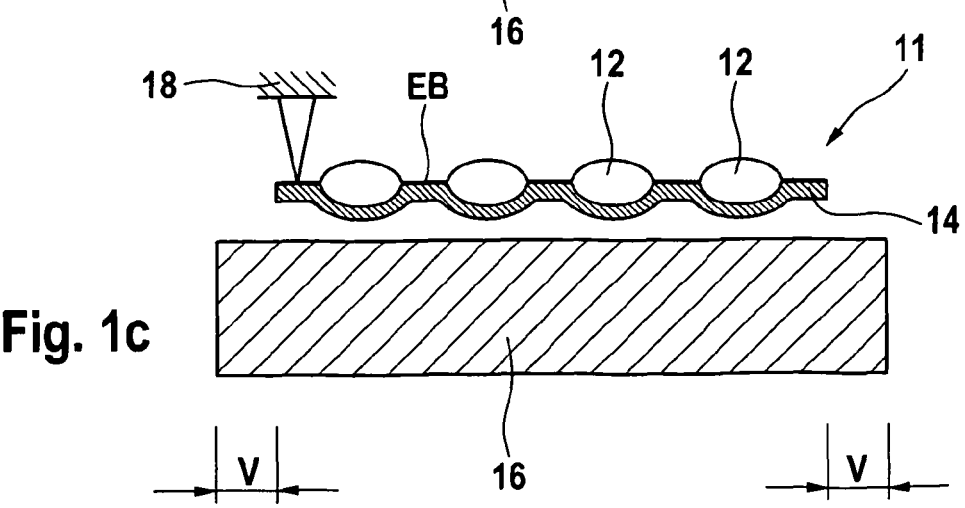
FIG. 1c is a section view of the device as shown in FIG. 1a with an inflated air chamber and lowered article.

Referring now to FIG. 1b there is illustrated a sectional view A-A of the device 11 along the line A-A of FIG. 1a. It is in this position that the device 11 is in contact with the article 14. On the retainer 14 attached to the air chamber 12, configured here as an adhesive layer, the article 16 is adhered and can be lifted in the direction of arrow H, and then forwarded by any means as desired. FIG. 1c is a view of the device 11 after inflation of the air chamber 12. Clearly evident is how the length of the device 11, due to inflation of the air chamber 12, has been reduced to twice the distance V from the original length. In this arrangement, the air chambers 12 and with them the retainer/bonding device 12 have become curved and by reducing the contact surface with the article 16, the holding or adhesive force is diminished such that the article 16 is no longer held and is released from the device 11. In the illustration of FIG. 1c. the device 11 according to the invention has just deposited the article 16.

Figure 2A:
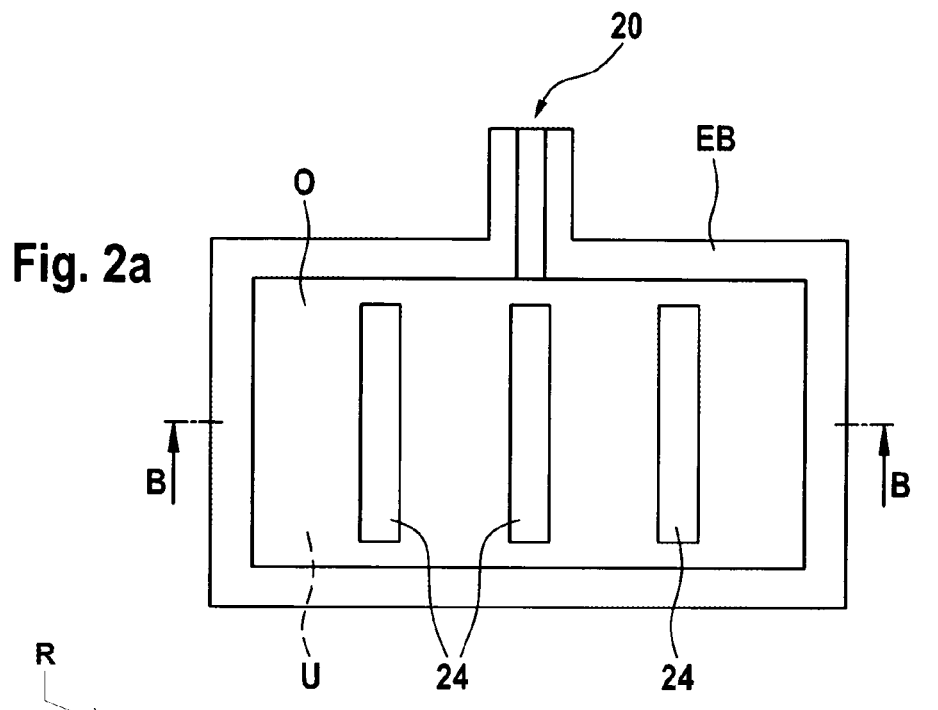
FIG. 2a is a view of a second example embodiment of the device in accordance with the invention with Velcro or magnets.
Figure 2B:
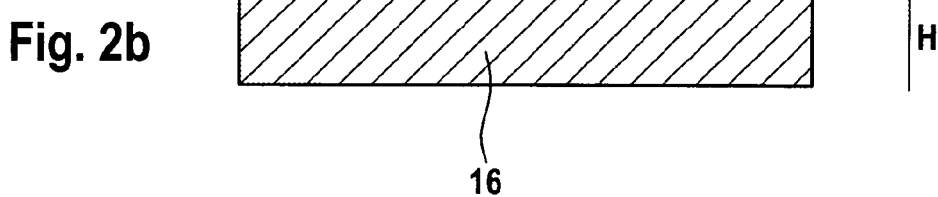
FIG. 2b is a section view of the device as shown in FIG. 2a with a non-inflated air chamber.
Figure 2C:
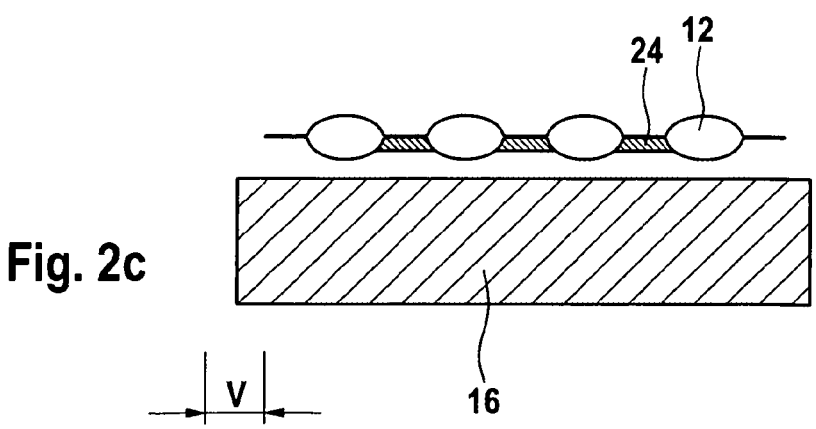
FIG. 2c is a section view of the device as shown in FIG. 2a with an inflated air chamber and a lowered article.

Referring now to FIGS. 2a to 2c there is illustrated how in an alternative embodiment of the invention the retainer 14 formed as an adhesive layer, is replaced by a retainer 24, configured, for example, here as Velcro strips 24 or, for example, magnetic tapes stitched into place. Function and sequence of functions correspond to those of the first example embodiment.

In both variants, the placement function is controlled by pressurizing the OPW member 12 (involving shortening, area reduction, third dimension, especially also shear forces).

In the following, reference is also made to other advantages and special features of the invention. Engineering the air chamber as an OPW component allows variable adjustment of the absolute adhesion. This design is possible by being able to individualize weaving to meet the requirement. The adhesive coating is particularly suitable for light articles. The customized combination of different textile components such as OPW, and sheet fabrics opens unlimited design possibilities. The mechanical movements afforded by the pressurization (thickness, shortening, reduction of the support surface, rotation, traction, shear forces/motion) can all be made use of. Now, individually adjustable and selectable are: the transfer by varying the setting of the retaining force of two devices in accordance with the invention configured simultanously as grippers, the relation of bond strength between adhesive surfaces and the reduction in the adhesive force relative to the force by weight.

Figure 3:
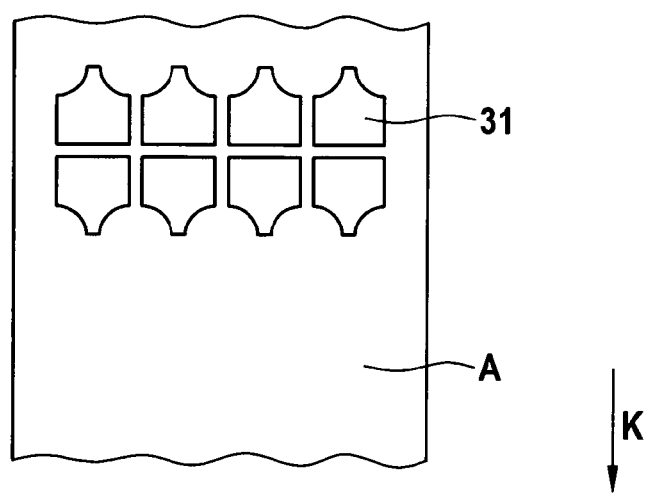
FIG. 3 is a diagrammatic view of a section of an OPW-woven web, in which individually designed fully fashioned woven components not being cut out yet are evident.

Referring now to FIG. 3 there is illustrated a section A of an OPW-woven web, in which individually designed fully fashioned woven components not being cut out yet are evident with integrated design features, X-tethers, tubes, traction threads and the like, or e.g. inventive devices 31 provided with air chambers 32 wherein the arrow K indicates the warp thread direction.

Further Features of the Invention:
Adhesive Gripper/Lifting Gripper Invention

The invention has the object of providing a gripper featuring variable adjustable absolute adhesion, partly or fully faced adhesive by means of undercured silicone, Velcro, magnets, for example.

The specific adhesion of the adhesive can be configured and set to meet specific requirements. The total force of adhesion is derived from the product of the surface area and the specific adhesion.

The absolute force of adhesion is varied by mechanical deformation in reducing the adhesive surface area, i.e. reducing the number of points of adhesion.

Example I

Lifting Gripper

| | |
|---|---|
| Given: Weight of item to be moved: | 80 to 100 N |
| Given: Specific adhesion of the adhesive surface | 0.5 N/cm$^2$ |
| a) Gripper parameter, lifting adhesion | >100 N (resulting from the max. weight of item). |

| | |
|---|---|
| => Gripper surface area | >200 cm² |
| b) Gripper parameter, releasing adhesion | <80 N (resulting from the min. weight of item) |
| => Gripper surface area | <160 cm² |

Implementation is as described above and here again in the form of an OPW gripper describing an adhesive-type OPW component. In FIG. 1a an adhesive surface area (here >200 cm²)) is assumed featuring adhesion. In FIG. 1b the entire adhesive surface area comes into contact with the article 16 (item). Reduction of the adhesive surface area in FIG. 1c) is achieved by pressurization. Since the item is connected only tangentially to the adhesion, this reduces the adhesive surface area (here <160 cm²) so that the item releases itself by its own weight from the gripper (force of the weight>absolute adhesion force).

Example II

Transfer Gripper

The given values are the same as indicated in Example I.

The transfer gripper A, B as shown in FIGS. 4 to 7 uses a device 41 in accordance with the invention with air chambers 42 and arranged thereon a retainer 44 configured analogous to the example embodiment shown in FIGS. 1a to 1c). The article or item 46 initially adheres to the gripper A (FIG. 4, left). The adhesive surface area 44 is not initially pressurized.

The gripper B moves as indicated by the arrow S in the direction of Gripper A, resulting in the item 46 coming into contact/connecting with the adhesive surface area 44.

Reduction of the absolute adhesive surface area is achieved by pressurization of adhesive surface area 44. Since the item 46 is connected only tangentially to the adhesion of the adhesive surface area 44, this reduces the adhesive surface area 44 of the gripper B and thus the absolute adhesive force of gripper B being greater than that of the gripper A. In this case, the absolute adhesive force may also be greater than the weight of the item 46.

Referring now to FIG. 6 there is illustrated how grippers A and B in being moved apart, gripper B moves in the direction of arrow L, the item 46 remaining on the gripper B since here the absolute adhesion force is higher in becoming detached from gripper A. The process is reversible and, except for an orientation against gravity, independent of the spatial position.

A reversal in function is feasible, depending on how the surface of the item (article) is textured, resulting in it becoming released from the gripper when the pressure is relieved.

What is claimed is:

1. A device for handling an article, comprising:
at least one inflatable air chamber that comprises at least first and second layers of woven textile fabrics, the air chamber being inflatable between an inflated state and an uninflated state; and
a retainer comprising a contact surface interposed between the air chamber and said article, the retainer secured along one of said first and second layers of said air chamber for holding said article,
wherein the retainer has a specific adhesion and exhibits a force of adhesion that is a product of the specific adhesion applied over the contact surface,
wherein when the air chamber is in the uninflated state, the contact surface of the retainer defines a first value such that the force of adhesion is sufficient to support said article against the force of gravity, and
wherein when the air chamber is in the inflated state, the contact surface of the retainer defines a second value that is less than the first value such that the force of adhesion is insufficient to support said article against the force of gravity and said article is released from the retainer.

2. The device as set forth in claim 1, wherein said air chamber has at least one seam extending around the two textile layers of fabric.

3. The device as set forth in claim 1, wherein said two textile fabric layers are stitched along the seam.

4. The device as set forth in claim 1, wherein said two textile layers of fabric are interwoven in one piece, wherein said seam represents a single-layer portion surrounding the two textile fabric layers as a woven seam in surrounding the air chamber.

5. The device as set forth in claim 4, wherein said retainer is designed as a bonding coating.

6. The device as set forth in claim 5, wherein said retainer comprises at least one active face of a Velcro fastener.

7. The device as set forth in claim 4, wherein said retainer comprises magnets.

8. The device as set forth in claim 1, wherein it comprises
A plurality of spaced-apart air chambers and
A plurality of retainers disposed between the air chambers.

9. A robotic or manipulator device, comprising at least one of said device for handling an article of claim 1.

10. A method for handling articles by a device as set forth in claim 1, characterized by the following steps:
Moving the device with its side comprising the retainer to the article for handling into a first position,
Allowing an adhesive bond between the retainer and the article for handling, thereby retaining the article,
Operating the device to a desired second position,
Releasing the article from the retainer by inflating said at least one air chamber.

* * * * *